Sept. 16, 1969  P. M. STRAIT  3,466,972
PORTABLE MILLING MACHINE
Filed Jan. 9, 1967
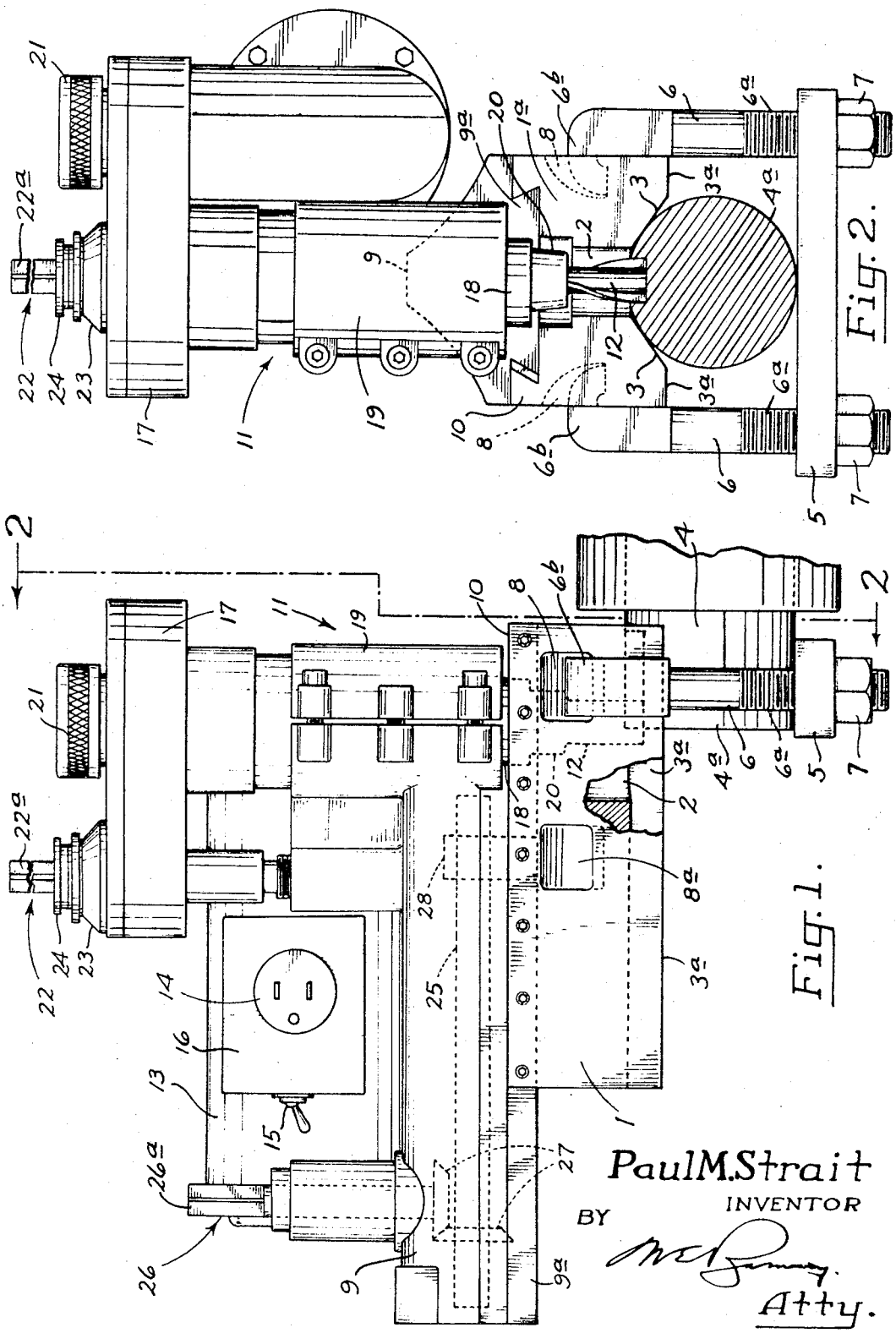
Paul M. Strait
INVENTOR
BY
Atty.

United States Patent Office 3,466,972
Patented Sept. 16, 1969

3,466,972
PORTABLE MILLING MACHINE
Paul M. Strait, Rte. 1, Box 345,
Tillamook, Oreg. 97141
Filed Jan. 9, 1967, Ser. No. 607,978
Int. Cl. B23c 1/20
U.S. Cl. 90—12                                3 Claims

ABSTRACT OF THE DISCLOSURE

A portable milling machine adapted to grip a work piece by one end thereof and to cut a keyway through the clamping area; that is, through the area being gripped. This is done without releasing the grip of the milling machine upon the work piece. This latter is accomplished by forming an elongated slot in the bed plate for said machine with lands formed upon the underside thereof, lying at opposite sides of the elongated slot. A clamp plate is arranged in stacked alinement with said lands and a work piece is gripped between said clamp plate and the lands on the bed plate. This structure permits a milling cutter to pass through said elongated slot to cut a keyway upon the work piece while said work piece is being gripped by one end, the cutting action being performed through the clamping area.

---

This invention relates to a portable milling machine that is specifically devised to be mounted upon and supported by a shaft, or other work piece, that it is joined to a machine. It is particularly designed to machine a projected or otherwise exposed shaft on an operative device while said shaft remains in place. This eliminates the necessity of dismantling the device before such machining operation can take place. That is, it is designed to be moved to a heavy piece of machinery and to operate thereon, without dismantling it, thereby eliminating "down time."

The object of my invention is to provide a milling machine with a bifurcated bed plate and with an associated clamp means for selectively engaging a shaft or other work piece between them, and permitting a milling tool to operate across the span of the engaging clamp without loosening the grip of the latter.

By selectively, I mean that plural laterally spaced clamping locations are defined, one lying immediately adjacent the end of a shaft to be machined, and another spaced further inboard of said shaft end. The difficult clamping area for said operation is when a machine clamps only a terminal end of a shaft to be key seated, for example. At this location, the center of mass of the milling machine overlies and extends beyond the unsupported shaft end. Also machining pressures must be exerted upon said cantilevered shaft and which is also the point at which the shaft is gripped. Usually the projecting end of such a shaft extends beyond an abutment a matter of an inch or two, and the projecting end serves as a clamping area as well as the area to be machined.

To cut away said shaft end, as in forming a keyway, substantial pressure must be exerted by a milling tool to produce radial boring and said tool must be fed longitudinally to cut such a keyway. Said operation must be performed precisely and these several forces must be resisted by the clamping means without overcoming the grip thereof upon the work piece. Usually the stiffness of the unsupported shaft end is sufficient to afford a firm base for mounting the cutting tool upon the exposed length (1½ inch, or so). It provides an uncertain grip if means cannot be devised to cut underneath a clamping member that also engage this area.

I have discovered that this operation can be performed with a milling machine having a bifurcated bed plate defining an elongated cutting way lying between said bifurcated portions and opening to one end of the bed plate. A clamping plate is associated in stacked relation with the bed plate and is adapted to grip a work piece tightly between them. A cutter head having dovetail ways straddles the cutting way and permits the milling cutter to form a cutting swath over the area being gripped by the clamp and the bed plate.

Further details of construction and the mode of operation of a machine embodying my invention is hereinafter described with reference to accompanying drawings, in which:

FIG. 1 is an elevation of a milling machine shown gripping the projecting end of a shaft or other work piece, showing a portion of the bed plate as being broken away to disclose the length of the bifurcated end of said bed plate; and FIG. 2 is a sectional view taken on the line 2—2 in FIG. 1, illustrating the manner in which a milling cutter may operate within the compass of the clamping portion of said milling machine embodying my invention and upon that portion of a work piece being gripped by said clamp.

A portable milling machine embodying my invention comprises a bifurcated bed plate 1, defining an elongated cutting way 2 intermediate the bifurcated portions 1a thereof, as is illustrated in FIG. 2. The undersurface of the bed plate 1, as it is illustrated in FIG. 2, has upwardly included lands 3 which are adapted to extend tangential to the peripheral sweep of a shaft 4, or other work piece of circular section. Said arrangement permits a relatively wide range of members to be accommodated beneath said bed plate. For example, with standard clamps, shafts may be provided with keyways, or be otherwise machined, from shafts from ⅝" diameter to 4½" diameter. Lying outside of said tapered lands 3 are flat horizontal areas 3a. Said flat surfaces provide an area upon which a flat work piece may be engaged.

A clamp plate 5 underlies a shaft or other work piece and the shanks of pairs of hooked toggle bolts 6 pass through the ends of the clamp plate. They are provided with threaded nuts 7 engaging the threaded shanks 6a of the toggle bolts to apply clamping pressure upon the work piece. The upper ends 6b have L-shaped ends formed thereon that engage alined pockets 8–8a formed in the sides of the bed plate. I usually provide two sets of pockets, one adjacent the ends of the bifurcated portions of the bed plate 1, as is shown in FIG. 1. Another set of alined pockets 8a is arranged towards the left, as viewed in FIG. 1. The latter are used if there is a sufficient length of work piece available for gripping. Sometimes to secure additional clamping securement, plural pairs of toggle bolts grip both pairs of pockets.

The obliquely sloped lands 3 and the flat surfaces 3a extend the full length of the bed plate. If only a short end of a shaft or other work piece may be gripped, as is shown in FIG. 1, I have found that adequate clamping pressure may be exerted when the parts are arranged as is shown in the drawing, engaging at least 1½ inches of the shaft end. A cutter head 9 has rail members 9a that engage complementary rails 10 formed in the upper face of the bed plate. Said rail members and said rails together constitute dovetail ways. A power driven cutter element 11 is journalled in the cutter head and is preferably provided with a helical milling head 12, as would be used in cutting a keyway in a shaft.

The manner in which power is supplied to said cutter element, the type of power used, the power drive, operation and setting is relatively unimportant with my invention and thus the parts, hereinafter described and illustrated, produce a compact, strong and sturdy machine, capable of accurate, dependable and fast operation in a portable miller.

Preferably an electric motor 13 is provided and it is powered through a socket 14, receptive to an electrical extension plug (not shown). A toggle actuated switch 15 serves as a make-and-break for the electrical supply to a switch box 16. The motor is provided with a multiple reduction gear train containing within its housing 17, driving a spindle 18 journalled in a housing 19. The spindle is provided with the usual chuck 20 for detachably holding a milling head 12. I preferably provide a manually adjusting knob 21 for rotating the spindle and chuck to aid in the mounting and dismounting of the milling head through the open end, as is viewed in FIG. 2. The depth of cut of the milling head is adjusted by a threaded rod 22 that has a noncircular head 22a, for accommodating a turning handle (not shown). An indexed depth gauge 23, engages the rod 22 and a lock nut 24 fixes it in set position.

A lead screw 25 journalled in the cutter head 9 and indicated in dotted outline in FIG. 1, is turned by feed screw 26 through a pair of mitre gears 27. A fixed feed nut 28 is secured to the base plate and is engaged by the thread upon the lead screw to move the cutter head over the bed plate (shown in dotted lines in FIG. 1). The feed screw 26 also has a noncircular end 26a which accommodates a handle (not shown). As a matter of convenience, I preferably provide noncircular ends for the feed screw and for the depth screw of similar size so that a common removable handle may serve selectively to turn both of said screws in fixing the depth and feed of the helical milling head.

As is illustrated in FIG. 2, each of the bifurcated portions 1a have relatively massive sections because they are called upon to withstand a great deal of operative pressure. Said portions extend lengthwise of the bed plate about one-third of its length, as is shown in FIG. 1. The non-forked portions of the bed plate are also massive and are capable of withstanding extreme pressures and rough usage.

The operation of a portable milling machine embodying my invention is as follows:

When it is necessary to cut or to repair a keyway in the end of a shaft while the shaft is in place in a machine, I arrange the bed plate towards one end of the cutter head, as is illustrated in FIG. 1. This can be done by manipulating the lead screw. If at least 1½ inches of a shaft projects from a machine, it is possible to grip said projecting end between the underside of the bifurcated bed plate 1, and the upper face of the clamp plate 5. The toggle bolts may be pulled tightly into place by adjusting the nut 7 and fitting the head 6b of the toggle bolts into the pockets. I preferably make said toggle bolt heads with a downward hook and form the floors of the pockets to conform to this pattern. This eliminates the possibility of the heads springing or wearing under pressure and becoming tipped inadvertently out of engagement. By making the bed plate and the clamping plate the top and bottom of a box-like structure and the toggle bolts the sides thereof, as shown in FIG. 2, I provide a relatively large working space within the clamp in which a milling head may operate in forming a keyway, for example, without relaxing the gripping pressure. Ordinarily, a keyway is relatively short, say 6 inches, or shorter. The stroke or cutter travel may extend 6¼ inches and it passes beyond the end 4a of the shaft 4. Most keys are substantially shorter than 6 inches and with a shaft end projection of 1½ inches, the keyway would not be longer than said projection. Thus, the key is formed within the length of the gripping area and usually the cutting stock bisects the gripping area.

With a machine weighing about 50 pounds and having physical compass of 7¼ x 11¼ inches and overall height of 12½ inches and with an electric motor developing 1½ H.P., I am able to cut a keyway in less than five minutes. The machine may be secured to a shaft and it automatically alines therewith if a projecting shaft end of at least 1½ inches is available. The keyways are precisely cut and may be operated by an ordinary mill mechanic. A portable milling machine embodying my invention will cut a one-inch keyway as fast and as accurately as a 7,500 pound milling machine supported by a foundation, but with far less setup time and without requiring dismantling of production machinery.

I claim:

1. A portable milling machine adapted to be clamped directly to a fixed work piece and overlying one end of the latter,
   a bifurcated bed plate defining an elongated cutting way between said bifurcated portions, said bifurcated portions having clamping lands formed there on substantially along the entire length thereof for engaging the work piece,
   a clamp plate being associated with said lands on the bed plate to receive a workpiece therebetween, means cooperating with said clamp plate and said bed plate for tightly gripping one end of the workpiece received between the clamp plate and the bed plate lands, said clamp plate associated with said plate lands being closer to the open end portion of the bifurcation on the bed plate than the closed end portion thereof,
   a cutter head with interlocking rail members, slidably mated rails on the bed plate, and defining with said rails a feed path for said cutter head,
   a power driven cutter element journalled in said cutter head and extending endwise through the elongated cutting way extending between the bifurcated portions of the bed plate, said way lying intermediate the mated rails and rail members, and lying parallel therewith,
   said cutting way being open at one end, said mated rails and rail members accommodating feed of the cutter head through said cutting way opening and between the bifurcated portions of the bed plate past said open end,
   whereby said portable milling machine may be clamped to and be supported by said work piece over a clamping area, and may cut a keyway across said clamping area without relaxing the grip of said bifurcated bed plate.

2. Claim 1 wherein said cooperating means include a pair of separable hook members adjustably joined to the sides of the clamp plate, and mated pockets formed in the bed plate, selectively to engage said hook members.

3. Claim 1 wherein said cooperating means include a pair of separable hook members adjustably joined to the sides of the clamp plate, and mated pairs of spaced pockets formed in the bed plate, selectively to engage said hook members.

References Cited

UNITED STATES PATENTS

| | | | |
|---|---|---|---|
| 1,532,650 | 4/1925 | Brewer | 90—12.2 |
| 2,373,341 | 4/1945 | Rowe | 90—12.2 |

ANDREW R. JUHASZ, Primary Examiner

G. WEIDENFELD, Assistant Examiner